United States Patent [19]

Black

[11] Patent Number: 4,729,879

[45] Date of Patent: Mar. 8, 1988

[54] PRODUCTION OF NITROGEN AND CARBON DIOXIDE

[76] Inventor: Robert B. Black, 2925 Denver St., Corpus Christi, Tex. 78404

[21] Appl. No.: 934,207

[22] Filed: Nov. 21, 1986

Related U.S. Application Data

[63] Continuation of Ser. No. 484,934, Apr. 14, 1983, abandoned, which is a continuation-in-part of Ser. No. 289,714, Aug. 3, 1981, abandoned, which is a continuation-in-part of Ser. No. 154,423, May 23, 1980, Pat. No. 4,313,399.

[51] Int. Cl.[4] .................... F01N 3/12; C01B 21/00; C01B 31/20
[52] U.S. Cl. .................... 422/189; 422/170; 422/182; 422/183; 423/212; 423/351; 423/437
[58] Field of Search ............... 423/351, 437; 422/182, 422/183, 170, 189

[56] References Cited

U.S. PATENT DOCUMENTS

| | | | |
|---|---|---|---|
| 1,154,171 | 9/1915 | Brownlee et al. | 423/351 |
| 1,154,172 | 9/1915 | Brownlee et al. | 423/351 |
| 2,314,827 | 3/1943 | Hortuet | 423/351 |
| 2,593,530 | 4/1952 | Bridges | 423/437 |
| 3,000,707 | 9/1961 | Barstow | 60/315 |
| 3,059,420 | 10/1962 | Schwabel | 423/437 |
| 3,073,684 | 1/1963 | Williams, Sr. | 422/182 |
| 3,170,280 | 2/1965 | Rees | 423/437 |
| 3,194,215 | 7/1965 | Barnes | 422/183 |
| 3,285,711 | 11/1966 | Stanford | 423/242 A |
| 3,464,801 | 9/1969 | Barstow | 423/213.5 |
| 3,581,490 | 6/1971 | Morris | 423/213.7 |
| 3,669,079 | 6/1972 | Black | 122/156 |
| 3,725,012 | 4/1973 | Gower | 252/372 |
| 3,738,816 | 6/1973 | Hirt | 422/183 |
| 3,993,449 | 11/1976 | Childs | 422/183 |
| 4,313,399 | 2/1982 | Black | 122/4 R |

FOREIGN PATENT DOCUMENTS

| | | | |
|---|---|---|---|
| 735366 | 5/1966 | Canada | 423/351 |
| 1275824 | 5/1972 | United Kingdom | 423/351 |

OTHER PUBLICATIONS

Olsen John C., Unit Process and Principles of Chemical Engineering, P. Van Nostrand Co., NY, NY, 1932, pp. 1–3.
"How the De Markus $N_2$ System Operates" publication.
"How the De Markus $CO_2$ System Operates" publication.

*Primary Examiner*—Gary P. Straub
*Attorney, Agent, or Firm*—Kenneth P. Synnestvedt

[57] ABSTRACT

Method and equipment are disclosed for production of nitrogen and carbon dioxide by a dual phase combustion of a hydrocarbon fuel and air, the exhaust products of the second phase of combustion being treated in a monoethanolamine absorber by which the carbon monoxide is absorbed and the nitrogen and carbon dioxide separated. The first stage of the dual phase combustion is effected in one or more combustion prime movers or engines and the second phase of combustion is effected by the addition of fuel to the exhaust products of the engine or engines; and a compressor is driven by each engine and the separated gases are separately passed through engine-driven compressors.

3 Claims, 4 Drawing Figures

PRODUCTION OF NITROGEN AND CARBON DIOXIDE

This is a continuation of co-pending application Ser. No. 484,934 filed on Apr. 14, 1983, now abandoned, which was a continuation-in-part of my prior application Ser. No. 289,714, filed Aug. 3, 1981, now abandoned, which in turn is a continuation-in-part of my application Ser. No. 154,423, filed May 23, 1980, which issued as U.S. Pat. No. 4,313,399 on Feb. 2, 1982.

BACKGROUND AND STATEMENT OF OBJECTS

Various techniques are known for the production of nitrogen and carbon dioxide from exhaust products derived from the combustion of a hydrocarbon fuel and air; and the present invention is concerned with improvements in a number of aspects of such techniques, relating particularly to the combustion technique employed for producing the exhaust products from which the gases are derived, relating to certain aspects of the gas separation, including generation of heat employed in the separation, and still further, to a novel system providing the energy required for driving compressors ordinarily employed to compress the separated nitrogen and carbon dioxide.

In various prior art techniques, a hydrocarbon fuel and air are burned in a boiler or other device having a combustion chamber; and the products of combustion are then treated to separate the nitrogen and carbon dioxide, either or both of these gaseous components being subjected to purification stages and ultimate delivery through compressors to storage tanks or other points of use. In typical cases of this prior art type, the products of combustion originate as flue gas and not only contain substantial amounts of nitrogen and carbon dioxide, but also contain appreciable quantities of oxygen (as excess air) and quite commonly an objectionable and dangerous quantity of carbon monoxide. Because of these factors, the production of the nitrogen and carbon dioxide is undesirably diminished; and in addition, special techniques may be required in order to eliminate or separately dispose of the objectionable carbon monoxide, and also the excess oxygen.

One important object of the invention is to provide a novel combustion system which is effected in two stages in a manner providing exhaust products of combustion from the second stage or phase of the combustion, which exhaust products are characterized by capability of greater production of nitrogen and carbon dioxide per pound of fuel and also by a striking improvement in the composition of the exhaust products delivered from the second phase of the combustion. Indeed, the products of the dual phase combustion according to the present invention are comprised almost solely of nitrogen, carbon dioxide and water vapor, with a minor fraction of a percentage point of oxygen, traces of the rare gases, such as helium, argon, etc., and usually, without any measurable quantity of carbon monoxide.

In accordance with the invention, the first phase of the combustion is effected in one or more combustion type prime movers or engines, for instance, an engine of the diesel type, the exhaust products from such an engine (containing free oxygen) being delivered to a combustion unit of special construction for effecting the second stage of combustion. Additional hydrocarbon fuel is introduced into the second stage combustion unit along with the engine exhaust products, and the resultant second stage combustion products have the improved composition above referred to. Still further, this two-stage system is utilized in a novel manner in another respect in connection with the overall production of the desired gases in that the engine or engines are utilized to drive one or more compressors, thereby making use of the shaft power derived from the first stage of combustion; and the compressor or the compressors are employed to compress the separated gases. This results in a very large power economy in a plant for producing gases from fuel and air. In contrast, if electrically driven, the power consumed to drive the compressors frequently amounts to a substantial portion of the total overall cost of the production operation in various of the known prior art plants.

In accordance with one embodiment of the invention, the combustion prime mover or engine employed comprises at least one diesel engine delivering exhaust gas consisting primarily of nitrogen, carbon dioxide and free oxygen, the free oxygen comprising at least 6% by volume of the exhaust gas. Such engines are also characterized by delivery of exhaust products containing only a very minor fractional percentage of carbon monoxide. In a typical case, such a diesel engine, when operating at a normal rated continuous load, yields an exhaust gas of the following composition (by volume):

|  | Excluding Water Vapor | Including Water Vapor |
|---|---|---|
| $O_2$ | 12.0123 | 11.343 |
| $CO_2$ | 6.5771 | 6.211 |
| $N_2$ | 81.4102 | 76.877 |
| $H_2O$ | — | 5.568 |
|  | 99.9996 | 99.999 |

In accordance with another embodiment of the invention, a combustion prime mover may be employed comprising a gas turbine engine; and this similarly delivers an exhaust gas also consisting primarily of carbon dioxide (2.9%), free oxygen (16.3%) and the balance nitrogen, without any significant trace of carbon monoxide.

According to the present invention, the first stage combustion products, such as those above referred to, are then subjected to a second stage of combustion in equipment of special type, as fully explained hereinafter; and additional fuel is added, thereby combining with the free oxygen in the exhaust products of the first stage.

In explanation of another important aspect of the invention, it is first pointed out that in the known technique for separating nitrogen and carbon dioxide from products of combustion, the gases being used are passed through what is known as an absorber in which the carbon dioxide is selectively absorbed, for instance, by an aqueous solution of monoethanolamine, the nitrogen passing through and out of the absorber. The monoethanolamine, rich in carbon dioxide, is delivered from the absorber into a stripper in which the solution of monoethanolamine and carbon dioxide is subjected to heat, thereby driving off the carbon dioxide, the monoethanolamine being then returned in a closed circuit for reuse in the absorber. In accordance with the present invention, the heat generated in the second phase of the dual phase combustion is utilized to heat an indirect heat transfer medium, such as water; and this medium either as hot water or as steam is employed in the stripper for the purpose of separating the carbon dioxide from the "rich" monoethanolamine solution. As is known, other absorbers may be used, for instance, other amines or potassium hydroxide. Preferably, the second phase of combustion is carried out in a unit providing for the generation of superheated water or steam; and in the stripper, in consequence of the stripping action, condensate or liquid is formed and is then returned either indirectly to the heat exchanger which is incorporated in the secondary combustion unit, or in the manner referred to just below.

When a diesel engine is employed for the first stage of combustion, the invention still further contemplates utilization of the cooling jackets of the diesel engine or engines for contributing heat to the medium for introduction into the stripper; and it is preferred to connect these cooling jackets into a return circuit flow path with the heat exchanger of the secondary combustion unit and the stripper, so that the cooled liquid or condensate is delivered from the stripper into the cooling jacket of the engine or engines constituting the first phase of the combustion system, the hot water from the engine jacket or jackets then being delivered into the heat exchanger of the secondary combustion unit, from which steam or superheated water is again delivered to the stripper. When using a diesel engine, this provides for an additional efficiency in that the heat of the engines employed for the first phase of combustion is utilized as a preheater to the heat exchanger in the secondary combustion unit, thereby effecting still another economy in the overall plant operation.

BRIEF DESCRIPTION OF THE DRAWINGS

How the foregoing and other objects and advantages are attained will be clear from the following description referring to the accompanying drawings, which illustrate an embodiment of the invention employing a diesel engine. In the drawings.

DETAILED DESCRIPTION

Figure 1:
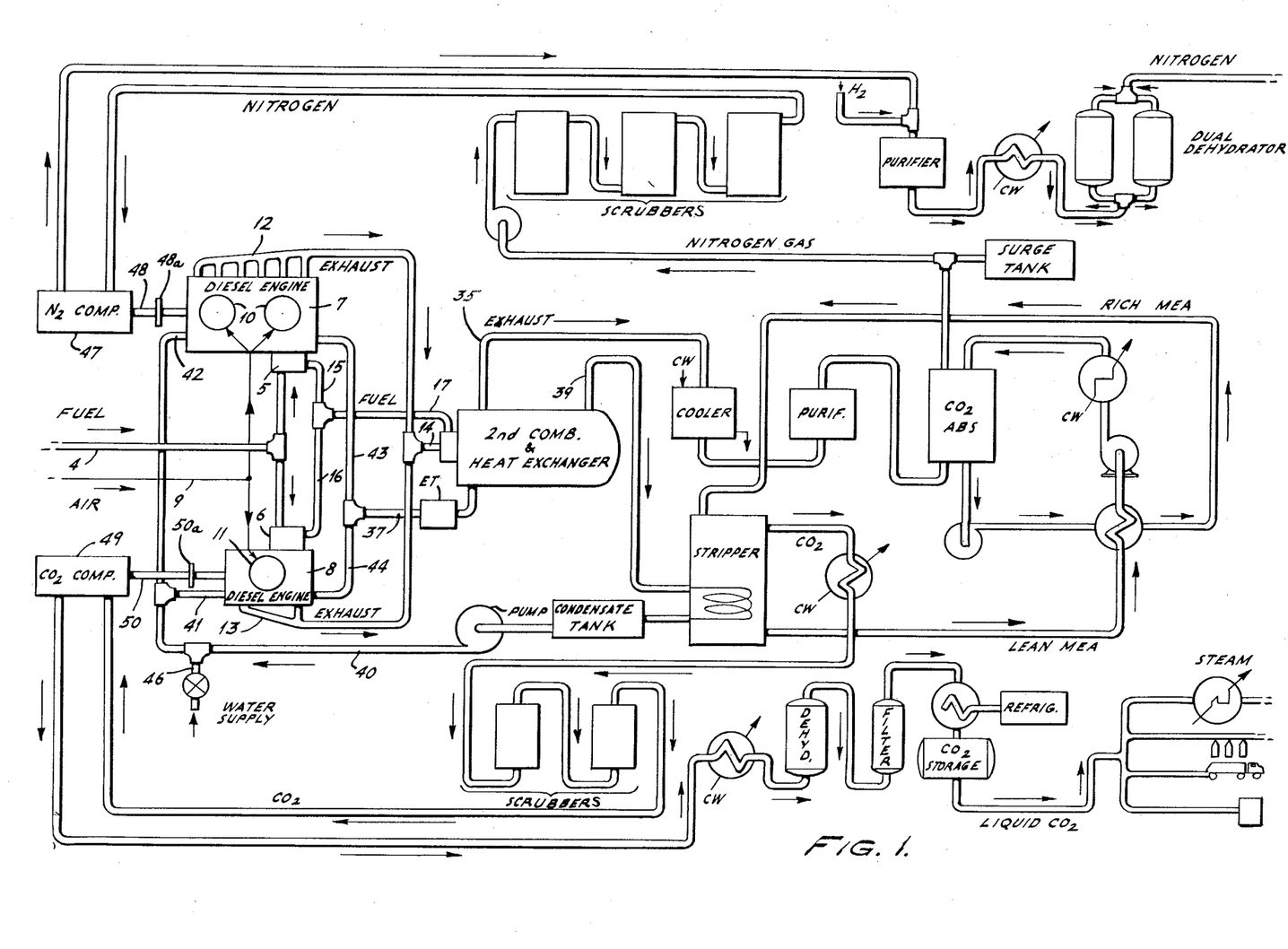
FIG. 1 is a schematic or diagrammatic view showing an overall plant embodying the improvements of the present invention.

Turning first to the schematic diagram of FIG. 1, it is noted that many of the units and components have legends applied which will clarify the arrangement and functioning of various parts of the system.

Toward the left of FIG. 1, a fuel inlet line is indicated at 4; and this line is extended to the fuel pumps 5 and 6, which are commonly associated with and driven by combustion prime movers or engines, such as indicated at 7 and 8. As indicated in the drawing, the engines in this embodiment are diesel engines and the fuel delivered to the engines is diesel oil, such as commonly employed for such diesel engines. Each engine is also provided with a blower for delivering air into the engine, and the air supply is diagrammatically indicated at 9, with branches extended to the engine driven blowers diagrammatically indicated at 10 and 11 in FIG. 1. In the diesel engine operation, the fuel is injected into air which is compressed in the cylinders; and the ignition occurs as a result of the elevation in temperature incident to the compression of the air. In some cases, some air may be intermixed with fuel before injection into the cylinders; but in the operation of diesel engines, most of the air is introduced into and compressed in the cylinders before the fuel is injected. Moreover, in diesel engines, an excess of air is always introduced.

Exhaust manifolds from the two engines are indicated at 12 and 13; and these manifolds are brought together and joined in a common connection 14 which delivers the exhaust products of the engines into the secondary combustion unit.

Preferably, the fuel pumps 5 and 6 are not only employed to deliver fuel to the fuel injection pumps of the engines 7 and 8 but are also employed to deliver fuel through the connections indicated at 15 and 16 to the common fuel line 17, which is extended for delivery of additional fuel into the secondary combustion unit.

In an embodiment of the invention where gas turbine engines are employed, one or more such engines would be utilized to yield the desired exhaust products which would be delivered to the connection 14 for introduction into the secondary combustion unit. A fuel pump or pumps for the gas turbine engine or engines may also be employed to deliver fuel to the secondary combustion unit, in the manner described above, for the diesel engines of the embodiment shown in the drawings.

Figure 2:
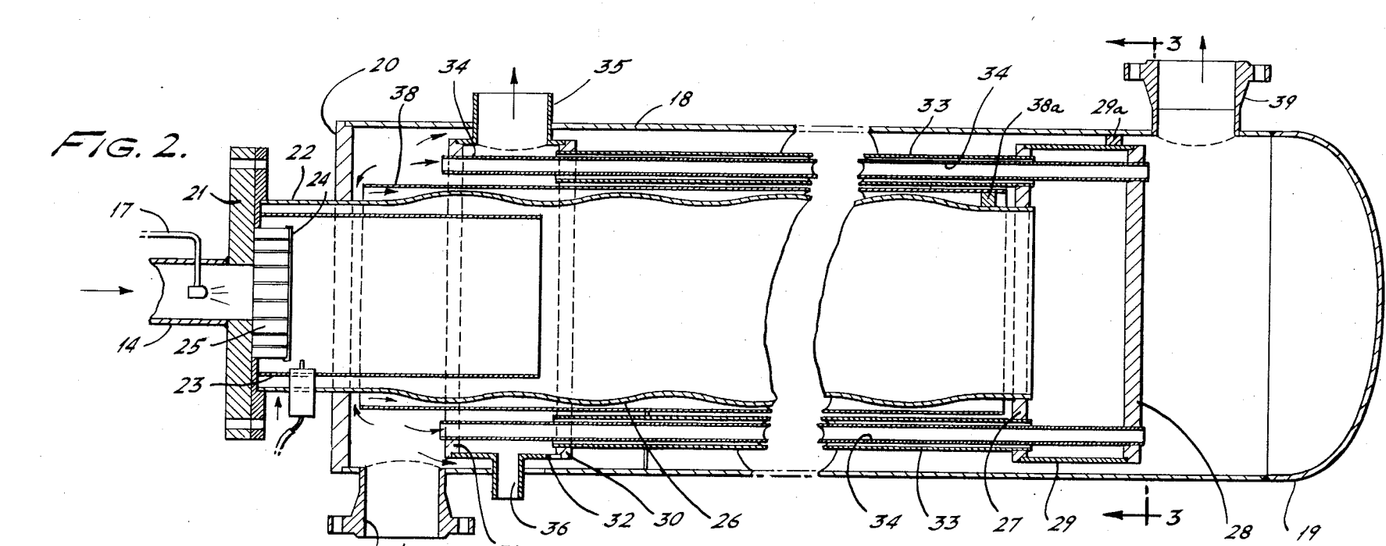
FIG. 2 is a longitudinal sectional view through a preferred form of secondary combustion unit incorporating a heat exchanger, as employed in the system of FIG. 1.
Figure 3:
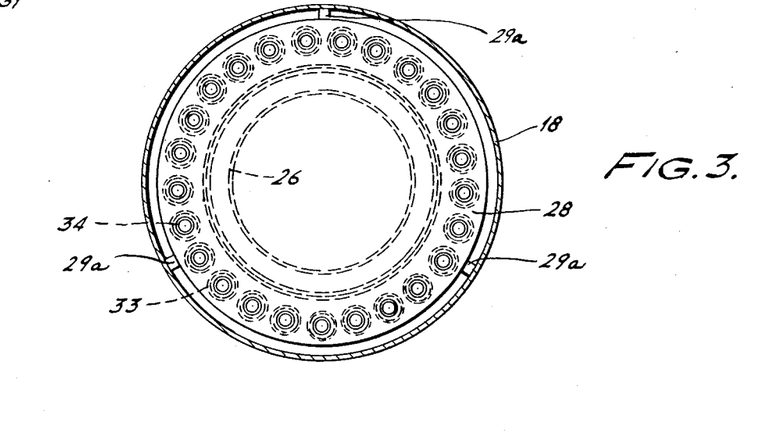
FIG. 3 is a transverse sectional view taken substantially as indicated by the section line 3—3 on FIG. 2.

At this point, attention is directed to FIGS. 2 and 3 which show the construction of a preferred form of the secondary combustion unit employed. This unit is housed in a shell 18 which is closed at the right hand end by the enclosure 19 and which is provided at the other end with the centrally apertured closure plate 20 with which the connections for the exhaust gases and additional fuel are associated. Here, it will be seen that the connection 14 for the exhaust products from the engines is connected with the plate 21 which, in turn, is mounted on the centrally apertured shell closure 20 by the cylindrical element 22. This cylindrical element 22 serves also to enclose a heat shield 23 which surrounds the combustion space of the secondary combustion unit; and the presence of this heat shield is of special importance in the second phase of the combustion, for reasons more fully explained hereinafter. The secondary fuel supply line 17 is preferably positioned to deliver the hydrocarbon fuel into the central region of the exhaust pipe 14 and delivers the secondary fuel against a splash plate indicated at 24, this plate being interconnected with the inner surface of the element 21 by a series of tilted blades 25 which are arranged circumferentially in a ring and which are spaced from each other, so that the products of combustion and the fuel are both caused to swirl and intermix, as they enter the heat shield area of the interior of the secondary combustion chamber formed within the secondary combustion unit. When employing a liquid fuel, such as diesel oil, the splash plate 24 has a high temperature during operation and vaporizes the liquid fuel before it is released through the swirl vanes 25 into the combustion zone lying within the heat shield 23. A suitable igniter may be associated with the space within the heat shield.

As seen in FIGS. 2 and 3, the secondary combustion unit has a corrugated tubular element 26 connected at its left hand end with the inner surface of the closure plate 20 and at its right hand end with a wall element 27.

The wall element 27 is annular and serves as a tube sheet, as does the spaced wall element 28, these two wall elements (27 and 28) being surrounded and interconnected by a cylindrical wall 29, so that the elements 27, 28 and 29 serve to define a header space lying within the cylindrical shell 18 of the overall unit.

Toward the left hand end of the secondary combustion unit, additional spaced tube sheets 30 and 31 are provided, these two sheets being annular and being interconnected by the cylindrical wall 32 in order to define another header space. The tube sheets 27 and 30 are connected longitudinally of the structure by a series of tubes 33. The tube sheets 28 and 31 are connected longitudinally of the structure by a series of tubes 34, the tubes 34 extended within the tubes 33 and having an outside diameter less than the inside diameter of the tubes 33 in order to provide annular flow spaces between each pair of tubes. The central chamber which is formed by the corrugated tubular element 26 communicates at its right hand end with the header space between the tube sheets 27 and 28 and the flow of the secondary products of combustion proceeds from this header space into the annular passages between the pairs of tubes, the products of combustion being delivered into the header space toward the left of the unit lying between the annular tube sheets 30 and 31.

The header space between the sheets 30 and 31 has an exhaust or outlet connection 35 from which the secondary exhaust products are delivered from the unit and carried into other portions of the system, as indicated in FIG. 1 and described more fully hereinafter. The header space between the tube sheets 30 and 31 also desirably has a condensate drain indicated at 36, preferably positioned at the lower side of the header space and being of construction adapted to discharge condensate, for instance, the condensate developed in consequence of cooling of the exhaust products under the influence of the indirect transfer of heat to the heat exchange medium described just below. Provision may be made for regulating the condensate discharge in order to avoid constant blow-off of gases.

The annular walls 29 and 32 of the header structures at the ends of the tubes are spaced from the inner surface of shell 18; and this spacing is preferably established and maintained by circumferentially spaced spacer elements, such as indicated at 29a in FIG. 3. The spacer elements are desirably secured only to the header walls, thereby providing freedom for relative expansion and contraction of the tube bundle and the shell.

The outer shell 18 of the secondary combustion unit defines a shell space in which an indirect heat transfer medium, preferably water, is introduced, an inlet connection 37 being provided for this purpose. Since the tube sheet 31 is spaced from the end closure plate 20, a header space is provided in the left hand end of the unit surrounding the central combustion chamber; and the inner tubes 34 of the tube-in-tube units communicate with this header space and carry the heat transfer medium therefrom to the opposite end of the unit where the tubes 34 deliver the heat transfer medium into the header space provided within the cover 19 to the right of tube sheet 28.

Since the cylindrical walls 29 and 32 of the headers, provided for the combustion products, are of smaller outside diameter than the inside diameter of the shell 18, additional flow space for the heat transfer medium or water is provided surrounding the entire tube bundle within the unit. Moreover, a cylindrical shell 38 is desirably provided between the outside surface of the chamber wall 26 and the pairs of tube-in-tube units, so that the heat transfer medium may enter between the outer surface of the tubular member 26 and the inner wall of the element 38. The right hand end of the element 38 terminates short of the tube sheet 27 in order to provide communication with the surrounding space within the outer shell 18.

From the above, it will be seen that there are three flow paths for the heat transfer medium from left to right through the unit. One such path is extended through the inner tubes 34. A second extends in surrounding areas between the headers and the inside surface of the shell 18 in contact with the outer surfaces of the outer tubes 33 of the tube-in-tube units.

The third path lies between the tube 26 and the cylindrical element 38. Preferably, the spacing and clearances of these three flow paths are proportioned to provide for similar volume flow through each path, thereby enhancing the heat exchange of the unit. The flow path provided between the element 38 and the tube 26 is of great importance in providing effective heat transfer from the outside wall of the tube 26 and thereby protect the tube from thermal deterioration or damage.

From FIG. 2, it will be observed that the three flow paths, provided for the water or heat transfer medium being heated in the secondary combustion unit, all extend substantially throughout the length of the unit. All three communicate with the header space within the left end of the outer shell 18 and they all communicate with the header at the right hand end, although the cylindrical element 38 terminates in the region of the inner tube sheet 27 of the header for the exhaust products at the right hand end; and from this region, the flow path extends around the outer side of the exhaust header and into the header lying within the end closure 19.

The cylindrical element 38 is preferably welded to the tube sheets 30 and 31, thereby defining the inner surface of the annular header space lying within the wall 32 between the tube sheets 30 and 31. Clearance is provided between the left end of the element 38 and the end closure 20, and this provides for entrance of the heat transfer medium into the space surrounding the tube 26. At the right hand end, clearance between the end of the element 38 and the tube sheet 27 provides for discharge of the heat transfer medium into the space between the pairs of tubes. The clearance between the right hand end of the element 38 and the right hand end of the tube 26 is desirably maintained by circumferentially separated spacer elements preferably secured to the element 38, one of which is shown at 38a.

Figure 1A:
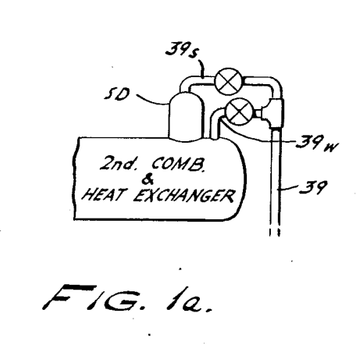
FIG. 1a is a fragmentary view of a modification of the system shown in FIG. 1.

Discharge from the header at the right hand end of the unit is provided by means of the outlet connection 39; and in the embodiment of FIGS. 1, 2 and 3, preferably, the unit is operated under conditions so that when water is employed, as is preferred, the discharge will be in the form of superheated water, which will be used in the system as shown in FIG. 1 in the manner described hereinafter. In an alternative embodiment shown in FIG. 1a, the secondary combustion and heat exchange unit is provided with a steam dome indicated at SD and a steam line 39s extends from the dome; and in addition, a separate line 39w is provided for superheated water. These lines are preferably provided with controllable valves, and serve to deliver either or both of the steam and superheated water through line 39 into the stripper in accordance with the system of FIG. 1. This alternative embodiment provides flexibility in the operating conditions.

With further reference to the structure of the secondary combustion unit, it will be noted that the inside tubular element 26 is of varying diameter at different axial points, somewhat in the manner of a low profile bellows. This provides a bellows effect thereby allowing axial expansion and contraction of the element 26 without imposing undue strain on certain other parts of the structure in consequence of fluctuations in temperature under different operating conditions, for instance, between a condition of no heat and a condition of normal operation.

Turning again to FIG. 1, it will now be seen that the exhaust products of the internal combustion engines are delivered through the connection 14 into the interior of the element 26, fuel also being supplied through the connection 17 as indicated. The products of combustion are delivered from the secondary combustion unit through the connection 35, which is indicated on both FIGS. 1 and 2, from which the secondary exhaust products, after cooling thereof in the secondary combustion unit, are delivered through appropriate devices including, if desired, an additional cooler and a purifier, before being ultimately delivered into the monoethanolamine carbon dioxide absorber.

In known manner, the absorber is employed to produce a carbon-dioxide-rich monoethanolamine solution, the nitrogen gas being separately discharged into the nitrogen system which is indicated at the top of FIG. 1 and which will be referred to again herebelow after consideration of certain other aspects of the system. The solution of carbon dioxide and the monoethanolamine is then delivered into the stripper; and in the stripper employed in accordance with the present invention, the source of superheated water or steam which is employed to heat the monoethanolamine solution and thereby separate the carbon dioxide is derived from the secondary combustion unit. In the embodiment of FIG. 1, superheated water may be delivered through the connection 39. When using the embodiment of FIG. 1a, the superheated water may be converted in the steam dome SD to low pressure (for instance 15 psi) steam at a temperature, for example, about 250° F.; and this steam may be delivered to the stripper through the connection 39.

The carbon dioxide released in the stripper is then delivered downwardly into the portions of the equipment toward the bottom of FIG. 1 which are provided for handling the carbon dioxide, as will also be described more fully hereinafter.

The condensate of the steam from the stripper is delivered toward the left into the condensate tank as indicated in FIG. 1 and is preferably pumped in a recirculation path extended through the connection 40, which has branches 41 and 42 delivering water into the jackets of the engines 8 and 7. From the jackets, the water is discharged through the connections 43 and 44 which join in a common connection 37 which, as described above in connection with FIGS. 2 and 3, introduces the water into the heat exchange elements of the secondary combustion unit.

A supply line for makeup water may be provided. In the schematic view of FIG. 1, this is diagrammatically indicated at 46 associated with the line 4, but may be associated with the condensate tank, as is frequently done. Other provision may be made for regulating the amount of water flowing into and out of the system; but in general, it is preferred that at least a substantial part of the water flowing through the engine jackets should be delivered through the heat exchange passages of the secondary combustion unit as is indicated. An expansion tank is preferably included in the water circulation system, for instance, in the position indicated at ET in FIG. 1.

By employment of the water circulation system above referred to, it will be seen that not only the heat of the secondary combustion unit is utilized to produce the steam to be employed in the stripper, but in addition, heat of the first phase of the combustion is utilized by the circulation of the water through the engine cooling jackets.

As above pointed out, the nitrogen is released from the carbon dioxide absorber through a line extended upwardly, this line being extended to and through appropriate scrubbers of known type, and the nitrogen is then delivered to a compressor 47 which is driven by the shaft 48 of the engine 7 through a clutch 48a. Similarly, the carbon dioxide, which is released from the stripper, is delivered downwardly to and through appropriate scrubbers of known type, and then is passed through a compressor 49 driven by the engine shaft 50 of engine 8 through a clutch 50a. After compression of the nitrogen and carbon dioxide components, those components may be delivered to appropriate additional treatment stages of known type and usually to storage receptacles for subsequent shipment or use. The compressed components may be stored or used either in gaseous form or may be liquified and then stored. In the case of the carbon dioxide component, it may be stored or shipped in solid (dry ice) form. Such treatment stages are diagrammatically indicated in FIG. 1 and need not be described in detail herein, since those features form no part of the present invention per se. In those portions of the schematic diagram of FIG. 1, various known units are labeled; and in a number of places, the letters "CW" indicate the use of cooling water.

However, it is of great importance that in the system according to the present invention, each of the compressors 47 and 49 is driven by one of the engines employed for the first phase of combustion of the fuel being used. As is well-known in the operation of a plant for producing nitrogen and carbon dioxide, a very large part of the operational cost is involved in providing the energy required to operate the compressors. Thus, the dual phase combustion technique used according to the present invention not only improves the composition of the exhaust products but also provides for generation of power for driving the compressors as a by-product.

It is further to be noted that in the system of the present invention, as diagrammatically represented in FIG. 1, the engine 7 is of larger capacity than the engine 8; and the engine 7, having the greater power, is used to operate the compressor employed for compressing the nitrogen and the smaller engine is used to drive the compressor 49 for the carbon dioxide. The reason for this differential with respect to the capacity and power of the engines is that the quantity of nitrogen to be compressed is at least several times (usually about 4.25 times by weight) the quantity of the carbon dioxide being produced from the same exhaust products. However, it is also contemplated according to the invention that a plant may be constructed incorporating various of the features above described but employing only a single engine and serving to produce and compress only one of the gases, for instance, the nitrogen, or alternatively, the carbon dioxide. Moreover, although it is contemplated to provide a plant for the production of both of these gases concurrently, the invention also contemplates that valving may be introduced to shut off one side of the system and actively use the other side at times when it is desired to produce only one of the gases.

Whether one or both gases are produced, the carbon dioxide absorber will be employed to separate the nitrogen from the carbon dioxide; and in known equipment for this general purpose, as shown toward the right of FIG. 1, the carbon dioxide absorber receives the combustion or exhaust products from the second stage of combustion, and the monoethanolamine with the absorbed carbon dioxide is delivered through the line which is labeled "Rich MEA", this line being extended to the stripper in which the monoethanolamine solution is heated in the manner described above, in order to separate out the carbon dioxide. The "Lean MEA" solution is then returned from the stripper in a closed circuit extending back to the absorber, as is indicated in the figure and as is known in techniques of this type.

With the dual phase combustion herein disclosed, employing one or more combustion prime movers or engines for the first phase of combustion and employing a secondary combustion unit of the type shown in FIGS. 2 and 3, it is possible to attain exceptional results with respect to the composition of the exhaust products, these exhaust products being especially well adapted to the separation of the nitrogen and carbon dioxide and also especially well adapted to effectively increase the production of these gases in a given plant.

There are a number of reasons why the system of the present invention produces an exhaust gas especially well adapted to the production of carbon dioxide and nitrogen. In the first place, the system of the invention virtually eliminates the presence of carbon monoxide in the exhaust products; and this is of great importance as it eliminates the necessity for any collateral treatment of the gases in order to separate or eliminate carbon monoxide. Other noxious ingredients are also virtually eliminated. Various reasons why the exhaust gases produced by the dual phase combustion are of improved composition include the following.

In the operation of diesel engines according to the embodiment shown in the drawings, an excess of air is introduced into the cylinders; and because of this, an adequate supply and an excess of oxygen is always present to react with the quantity of fuel injected into the diesel engine, even under normal rated continuous load. As indicated in the example given hereinabove, the diesel engine yields an exhaust gas comprised primarily of nitrogen, but including an appreciable quantity of carbon dioxide and virtually no carbon monoxide or other undesirable ingredients. Moreover, such a diesel engine may readily be operated to yield exhaust products containing a substantial percentage of free oxygen. A content of free oxygen of from about 8% to 15% may readily be attained.

Some water or water vapor may also be produced, as is indicated hereinabove; but this is not an objectionable constituent nor is it one creating difficulties with respect to recovery of the desired gaseous components.

With respect to the amount of free oxygen present in the exhaust gases from the diesel engines, it is noted that normal operation of a diesel engine will yield an exhaust gas containing a quantity of free oxygen sufficient to sustain secondary combustion, which is in contrast to the exhaust products from certain other types of engines, notably spark-ignition gasoline engines, such as commonly used in automobiles, and in which the fuel and air ignited in the cylinder are intermixed prior to introduction into the cylinder. The exhaust products from engines of this latter type have only a minor fraction of a percentage of free oxygen, while at the same time, contain a substantial quantity, even up to as much as 3% to 7%, of carbon monoxide.

Since the present invention contemplates the embodiment of dual phase combustion, the use of the diesel engine as the first phase is well adapted to the purposes of the invention because of the substantial quantity of free oxygen present in the combustion products delivered from the diesel engine; and the operation of the diesel engine should be controlled so as to yield combustion products containing at least about 6% of free oxygen, which is about the minimum which is practicable for sustaining a second phase of combustion.

For the above purposes, Applicant's system contemplates introduction of fuel into the combustion products delivered from the first stage of combustion in a quantity preferably not in excess of the stoichiometric quantity calculated on the basis of the quantity of free oxygen present. Excess of fuel over and above the corresponding quantity of free oxygen has a tendency to augment the production of undesirable constituents, notably carbon monoxide.

From the above, it will be seen that when using diesel engines for the first stage of combustion, the present invention not only provides substantial shaft power for driving compressors and also an appreciable amount of heat transfer to the medium used to heat the gases in the stripper, but also yields an exhaust gas product which is particularly well adapted to secondary combustion, especially in a secondary combustion unit of the type herein disclosed with particular reference to FIGS. 2 and 3.

In connection with the secondary combustion unit, a number of significant points are to be noted. First, the secondary combustion unit is characterized by the use of a heat shield (identified by the reference numeral 23 in FIG. 2), which heat shield lies within the tubular element 22 of the secondary combustion unit. The heat shield extends sufficiently downstream from the inlet of primary combustion products and the additional supply of fuel, so that the actual combustion is substantially completed within the heat shield. The heat shield is preferably formed of highly refractory material so as to withstand very high temperatures; and for the purposes of the secondary combustion, the secondary combustion is adjusted to take place at a relatively high temperature, preferably between about 2500° F. and 3000° F. This will provide for operation of the heat shield at a temperature between about 1500° F. to 2200° F.

Operating at a high temperature in the secondary stage of combustion establishes what is sometimes referred to as a "thermal catalytic action"; and the effect of this high temperature secondary combustion is to yield a secondary combustion product essentially consisting of nitrogen, carbon dioxide and water vapor. Very small fractional percentages of certain other inert gases may be present; and in addition, a small fractional percentage of oxygen may remain, but these minor constituents present no significant problems. It is also of special advantage that this type of secondary combustion yields an exhaust product usually containing virtually no carbon monoxide.

The secondary combustion effected in the secondary combustion unit above described not only occurs at the relatively high temperature referred to, but also is effected under relatively uniform pressure conditions, as compared with the violent and extensive pressure fluctuations incident to fuel explosions, such as occur in spark-ignition gasoline engines. Referring again to FIG. 2, it will be noted that the primary combustion products entering through the duct 14, together with the added quantity of fuel introduced at 17, preferably by spray type of injection, are subjected to an intermixing by virtue of the inclined fins 25 as the products enter the combustion space within the heat shield. The thorough admixture provided by the fins 25 is of importance; and another factor which should be noted is that the pulses of the primary combustion products delivered from the diesel engine are passed directly through the exhaust connections and the conduit 14 into the secondary combustion unit without passage through a muffler. This results in some pulsation of the entering gases and this feature enhances the intimate admixture of the gases and the added fuel being introduced and burned within the heat shield. The heat radiation from the heat shield enhances heat transfer efficiency.

Another factor to be noted in connection with the secondary combustion unit is that the shell 26, which is subjected to contact with the heat transfer medium on its outer surface, surrounds the heat shield 23 in spaced relation. Since the shell 26 is surrounded by water, a cooling effect is communicated to the heat shield thereby restricting excessive temperature rise in the heat shield and thereby protecting the heat shield from excessive temperatures which would tend to damage or melt the material of which the heat shield is formed.

The secondary combustion products are delivered through various of the heat exchange passages of the secondary combustion unit, for ultimate discharge through the connection 35 which, as above described, is connected with the equipment for separating and recovering the nitrogen and oxygen.

In a typical instance, in which the fuel employed was diesel engine fuel and in which a diesel engine was employed for the first phase of combustion, the exhaust products delivered from the second stage of combustion showed that the gaseous constituents of the exhaust products had the following composition, in percentages by volume, when analyzed by Orsat tests:

$CO_2$: 13.8
$O_2$: 0.2
$CO$: 00.00
$N_2$: 86.0

These figures represent the composition excluding water vapor.

It will be understood that, as is customary in a percentage analysis of the above type, percentage given for the nitrogen constituent actually contains very small fractional percentages or traces of certain other rare inert gases, such as helium, argon, etc. However, for most purposes, in the separation and handling of the gases, the presence of such traces of other inert gases in the nitrogen constituent is not detrimental. Indeed, these other gases are even more inert than the nitrogen itself.

From the foregoing, it will be seen that the dual phase combustion contemplated by the present invention and utilizing the diesel type of engine for the first phase of combustion, and the continuous burning in the secondary combustion unit, provides an exhaust gas particularly well adapted to the production and isolation of carbon dioxide and nitrogen. In addition, the first phase of combustion provides a source of shaft power for operating compressors (driven by the diesel engines) and both the first and the second phases aid in generating a heat transfer medium which is required in the gas separation techniques used for recovery of the carbon dioxide and nitrogen.

In a typical case of the dual phase combustion of this invention, each pound of fuel burned will yield over twelve pounds of nitrogen, about three pounds of carbon dioxide and close to two pounds of steam or water. The water is substantially mineral-free and is, therefore, a valuable by-product.

The composition of the secondary exhaust products given above is of particular significance and great importance from several standpoints. Thus, as already mentioned, the absence of carbon monoxide is, of course, of great importance. In addition, the very low content of oxygen is also of significance; and this low oxygen content facilitates the separation of the nitrogen and carbon dioxide.

In connection with the quantity of fuel added to the exhaust products from the first phase of combustion in order to provide for the second phase of combustion, it is preferred that the amount of fuel introduced into the secondary combustion unit should approach but preferably not exceed the stoichiometric quantity calculated in relation to the content of free oxygen present in the combustion products delivered from the primary phase of combustion. If the quantity of fuel is considerably less than that stoichiometric quantity, substantial quantities of unwanted oxygen will remain in the secondary combustion products. If the quantity of fuel is greater than that required to remove the oxygen, the result will be the formation of carbon monoxide and carbon soot, both of which are highly undesirable.

As a simple test for determining the correct amount of fuel to add for the secondary combustion phase, the free discharge of a sample of the secondary combustion products may be effected. If black soot is easily detectable in the sample discharge, this indicates the presence of carbon and is also a sign of the presence of carbon monoxide; and these signs indicate that the level of the fuel input to the secondary combustion is too high and should be reduced until black soot does not appear. More precise control can be obtained by the use of gas analysis, particularly with automatic controls.

With further reference to the embodiment of the secondary combustion unit shown in FIGS. 2 and 3, it is pointed out that this unit not only provides the high combustion efficiency above explained, but in addition, the tube-in-tube heat exchange units provide high efficiency of heat transfer, particularly in view of the fact that the secondary combustion products and the water or other heat transfer medium being heated are passed in counterflow relation to each other through the inner and outer tubes of the tube-in-tube units. The unit is also of high efficiency because of the fact that the water or other transfer medium surrounds the entire bundle of tubes, headers and the combustion chamber for the secondary combustion phase. It will be understood that to increase thermal efficiency, an insulating jacket may also be provided around the outside of the shell 18 of this unit.

Preferably, the heat exchange is effected under conditions which will deliver steam from the outlet connection 39, for delivery to the stripper. In addition, the preferred operating conditions should result in substantial reduction in temperature of the secondary products of combustion before they are delivered from the offtake 35; and with the preferred operating conditions, at least a substantial amount of moisture in the combustion products would be condensed and delivered through the condensate discharge 36.

It is to be understood that the system of the present invention is capable of producing both nitrogen and carbon dioxide gases in forms of varying purity. For many purposes, it is preferred to produce substantially pure gases, i.e., gases containing only very minor, preferably fractional percentages of contaminants. Almost absolute purity can be attained, even up to 99.95%. However, for many applications, such as tank and gas line purging, even substantially pure gases are not necessary and production costs will be less.

Although the embodiment illustrated in the drawings, and fully described above, employs diesel engines for the first phase of combustion, as is mentioned hereinabove, it is also possible to employ one or more gas turbines for the first phase of combustion. In both diesel engines and gas turbines, air is introduced into combustion chambers (the cylinders of diesel engines) and in both of these types of engines, fuel is injected into the air in the combustion chambers. In both diesel engines and gas turbines, an excess of air is introduced before combustion and is present in the exhaust products. Therefore, the exhaust products of gas turbines and diesel engines are both well suited for use in the dual phase combustion system of the present invention. In addition, the exhaust products of both diesel and gas turbine engines are characterized by a virtual absence of carbon monoxide.

In the event of employment of one or more gas turbine engines for the first phase of combustion in accordance with the present invention, the fuel pumps employed may serve to deliver fuel not only into the gas turbine engine but also to supply the fuel for the second stage of combustion, as in the embodiment of the diesel engines shown in FIG. 1. Also, in both of these types of engines, the engine is used to drive a blower for introducing the air.

Since gas turbine engines ordinarily do not have water jackets or water cooling systems, when gas turbines are used, the hot water employed in the stripper may be heated merely by the heat exchange components of the secondary combustion system.

I claim:

1. Apparatus for use in the separation of at least one gaseous component from the combustion products of a hydrocarbon fuel and air comprising:
   (a) a diesel engine in which a mixture of the fuel and air is subjected to a first stage of combustion yielding primary products of combustion containing at least 6% by volume of free oxygen,
   (b) a secondary combustion unit comprising an elongated tubular element defining an elongated secondary combustion chamber having an inlet end and an outlet end,
   (c) an end closure wall at the inlet end of the secondary combustion chamber,
   (d) means for introducing primary combustion products and secondary combustion fuel through said end closure wall into the inlet end of the secondary combustion chamber,
   (e) a discharge connection for delivering secondary combustion products from the outlet end of the secondary combustion chamber,
   (f) a cylindrical heat shield in the inlet end portion of said elongated secondary combustion chamber, the cylindrical heat shield comprising a cylindrical wall spaced inwardly from said tubular element defining the secondary combustion chamber and providing an annular heat shield space between the heat shield wall and said tubular element, the cylindrical wall of the heat shield having an inlet end connnected with said closure wall at the inlet end of the secondary combustion chamber and having an outlet end opening presented toward and communicating with the outlet end portion of the secondary combustion chamber,
   (g) a cyllindrical shell forming a housing for the secondary combustion chamber, said shell surrounding the tubular element in spaced relation to provide an annular chamber between the shell and said tubular element,
   (h) means for separating at least one gaseous component from the secondary products of combustion, including a gas absorber containing an absorber liquid in which carbon dioxide is selectively absorbed, the secondary products of combustion being delivered from said discharge connection of the secondary combustion unit into the gas absorber,
   (i) a stripper for separating the absorbed carbon dioxide from the absorber liquid and including indirect heat exchange means carrying a heat exchange fluid for heating the absorber liquid,
   (j) and an indirect heat exchange system for absorbing heat from the tubular element of the secondary combustion chamber and being connected to the indirect heat exchange means for heating the absorber liquid in the stripper, said indirect heat exchange system including
   circulating means in said annular chamber between the tubular element defining the secondary combustion chamber and the surrounding cylindrical housing shell and having an inlet and an outlet providing for circulating said indirect heat exchange fluid in heat exchange relation to said tubular element defining the secondary combustion chamber in the region of said annular heat shield space and also in the region of the tubular element of the secondary combustion chamber downstream of said heat shield space, and thereby transfer heat from the secondary combustion chamber to the indirect heat exchange fluid, and said indirect heat exchange system further including means for delivering indirect heat exchange fluid from the circulating means in said annular chamber into the indirect heat exchange means of said stripper, and thereby heat the absorber liquid in the stripper.

2. Apparatus as defined in claim 1 in which the diesel engine has a cooling jacket, and means for circulating said heat exchange fluid from the indirect heat exchange means of the stripper into and through said cooling jacket and thence into and through said cylindrical shell forming a housing for the secondary combustion chamber.

3. Apparatus as defined in claim 1 and further including a compressor connected with an driven by the diesel engine and means for circulating a separated gaseous component of the combustion products through said compressor.

* * * * *

UNITED STATES PATENT AND TRADEMARK OFFICE
CERTIFICATE OF CORRECTION

PATENT NO. : 4,729,879
DATED : March 8, 1988
INVENTOR(S) : Robert B. Black

It is certified that error appears in the above—identified patent and that said Letters Patent is hereby corrected as shown below:

ABSTRACT OF THE DISCLOSURE - lines 5 and 6 -

"carbon monoxide" should read --carbon dioxide--.

Signed and Sealed this

Thirteenth Day of September, 1988

Attest:

DONALD J. QUIGG

*Attesting Officer*  *Commissioner of Patents and Trademarks*